United States Patent
Wesche et al.

(10) Patent No.: US 10,938,007 B2
(45) Date of Patent: Mar. 2, 2021

(54) BATTERY HOUSING AND MOTOR VEHICLE COMPRISING A BATTERY HOUSING OF THIS KIND

(71) Applicant: Volkswagen Aktiengesellschaft, Wolfsburg (DE)

(72) Inventors: Carsten Wesche, Braunschweig (DE); Stefan Schacht, Braunschweig (DE); Henrik Fehner, Bremen (DE); Robin Gerlach, Braunschweig (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 0 days.

(21) Appl. No.: 16/445,547

(22) Filed: Jun. 19, 2019

(65) Prior Publication Data
US 2019/0393459 A1 Dec. 26, 2019

(30) Foreign Application Priority Data
Jun. 21, 2018 (DE) .................... 10 2018 210 121.3

(51) Int. Cl.
*B60K 11/00* (2006.01)
*H01M 2/10* (2006.01)

(52) U.S. Cl.
CPC ....... *H01M 2/1083* (2013.01); *H01M 2/1077* (2013.01); *H01M 2220/20* (2013.01)

(58) Field of Classification Search
CPC .. B60K 11/06; H01M 2/1083; H01M 2/01077
See application file for complete search history.

(56) References Cited

U.S. PATENT DOCUMENTS

| 5,886,501 A | * | 3/1999 | Marks | H01M 2/1083 |
| | | | | 320/112 |
| 6,227,322 B1 | * | 5/2001 | Nishikawa | B62D 29/008 |
| | | | | 180/68.5 |

(Continued)

FOREIGN PATENT DOCUMENTS

| DE | 102015101096 A1 | 7/1916 | ............... B60K 1/04 |
| DE | 102016110330 A1 | 12/1917 | ............... B60K 1/04 |

(Continued)

OTHER PUBLICATIONS

DE 102016110330 A1 US 2019/0131602 A1.

(Continued)

*Primary Examiner* — Hau V Phan
(74) *Attorney, Agent, or Firm* — Slayden Grubert Beard PLLC

(57) ABSTRACT

The invention relates to a battery housing for a battery of an electrically driven motor vehicle, having a tray-shaped receptacle having a housing base and a housing frame, wherein the receptacle forms a housing interior, wherein the housing frame is formed of two rigid longitudinal side profiles and two rigid transverse side profiles, which extend transversely to the longitudinal side profiles, wherein the longitudinal side profiles have a lower profile longitudinal face that faces the housing base and an upper profile longitudinal face that faces away from the housing base, and wherein a deformation profile is formed onto the relevant longitudinal side profile, which deformation profile projects laterally beyond the longitudinal side profile outside the housing in the region of the lower profile longitudinal face. Furthermore, the invention relates to an electrically driven motor vehicle comprising a battery housing of this kind.

10 Claims, 4 Drawing Sheets

(56) References Cited

U.S. PATENT DOCUMENTS

| | | | | |
|---|---|---|---|---|
| 8,689,919 | B2* | 4/2014 | Maeda | B60R 16/04 |
| | | | | 180/68.5 |
| 8,835,033 | B2* | 9/2014 | Choi | B60L 3/0015 |
| | | | | 429/100 |
| 9,956,859 | B2* | 5/2018 | Ikeda | H01M 2/1083 |
| 10,259,506 | B2 | 4/2019 | Ayukawa | |
| 2011/0297467 | A1* | 12/2011 | Iwasa | B60L 50/64 |
| | | | | 180/65.31 |
| 2012/0301765 | A1* | 11/2012 | Loo | H01M 2/1083 |
| | | | | 429/100 |
| 2013/0192914 | A1 | 8/2013 | Nakamori | 180/68.5 |
| 2013/0270863 | A1 | 10/2013 | Young et al. | 296/187.12 |
| 2014/0338999 | A1* | 11/2014 | Fujii | B60K 11/06 |
| | | | | 180/68.5 |
| 2015/0249240 | A1* | 9/2015 | Hihara | H01M 2/1083 |
| | | | | 180/68.5 |
| 2018/0134320 | A1 | 5/2018 | Jeong | |
| 2019/0131602 | A1 | 5/2019 | Hilfrich et al. | |

FOREIGN PATENT DOCUMENTS

| | | | | |
|---|---|---|---|---|
| DE | 102016115611 B3 | 2/1918 | | B60K 1/04 |
| DE | 102017123400 A1 | 5/1918 | | B60K 1/04 |
| DE | 102006041102 A1 | 3/2008 | | B62D 25/02 |
| DE | 102010018725 A1 | 11/2011 | | B60K 1/04 |
| DE | 102012100977 B3 | 7/2013 | | B60K 1/04 |
| DE | 102013008428 A1 | 12/2014 | | B60K 1/04 |
| DE | 102014200671 A1 | 7/2015 | | B62D 21/08 |
| DE | 102016013633 A1 | 5/2018 | | B62D 25/20 |

OTHER PUBLICATIONS

DE 102017123400 A1 US 10259506 B2.
German Office Action, Application No. 102018210121.3, 6 pages, dated Mar. 18, 2019.

* cited by examiner

BATTERY HOUSING AND MOTOR VEHICLE COMPRISING A BATTERY HOUSING OF THIS KIND

CROSS-REFERENCE TO RELATED APPLICATIONS

This application claims priority to German Patent Application No. DE 10 2018 210 121.3, filed on Jun. 21, 2018 with the German Patent and Trademark Office. The contents of the aforesaid application are incorporated herein for all purposes.

TECHNICAL FIELD

The invention relates to a battery housing of an electrically driven motor vehicle, the battery housing having a tray-shaped receptacle having a housing base and a housing frame. Furthermore, the invention relates to a motor vehicle of this kind.

BACKGROUND

An electrically driven motor vehicle typically has a battery (traction battery), which provides an electrical machine for driving the motor vehicle with energy. An electrically driven motor vehicle should in particular be understood to mean an electric vehicle which stores the energy needed for driving solely in the battery (BEV, battery electric vehicle), an electric vehicle comprising a range extender (REEV, range extended electric vehicle), a hybrid vehicle (HEV, hybrid electric vehicle) and/or a plug-in hybrid vehicle (PHEV, plug-in hybrid electric vehicle).

The application of a force caused in particular by an accident, i.e., by a crash or collision, may damage the battery. In the event of such damage, the energy stored in the battery may for example be released in an explosive manner. Furthermore, the risk of fire and/or hazards resulting from an electrical discharge of the battery may arise for the vehicle passengers (occupants).

In order to prevent damage to the battery, a deformation element, for example, is used which absorbs kinetic energy of an object acting on the deformation element in the event of an accident and, by means of the deformation of said deformation element, converts the kinetic energy into deformation energy.

An arrangement for storing at least one drive energy store arranged in a housing in a motor vehicle is known from DE 10 2013 008 428 A1, a first and a second deformation element being arranged in each case on opposing sides of the housing between the housing and rigid bodywork elements, which deformation elements have different force-travel characteristics. The first deformation element is arranged closer to the housing than the second deformation element.

Furthermore, in order to prevent damage to the battery, (stiffening) elements are provided, for example, which are intended to prevent deformation of the battery. A housing for a vehicle battery is disclosed in DE 10 2016 110 330 A1. The housing has a cover plate and a base plate, a frame connected to the cover plate and base plate being arranged therebetween. Metal sheets are arranged in the frame in order to dissipate forces acting on a connection point, which metal sheets extend diagonally in the cross-section of the frame.

SUMMARY

An object of the invention is to provide a suitable battery housing, which protects a battery received therein from external application of force and thus possible damage. Another object is to provide a motor vehicle comprising corresponding a battery housing.

This object is solved by of a battery housing and an electrically driven motor vehicle having the features of the independent claims. Developments and embodiments are the subject matter of the dependent claims and the following description.

In one aspect, a battery housing for a battery of an electrically driven motor vehicle is provided. The battery housing comprises a tray-shaped receptacle having a housing base and a housing frame, wherein the receptacle forms a housing interior. The housing frame is formed of two rigid longitudinal side profiles and two rigid transverse side profiles, which transverse side profiles extend transversely to said longitudinal side profiles. The longitudinal side profiles have a lower profile longitudinal face that faces the housing base and an upper profile longitudinal face that faces away from the housing base. A deformation profile is formed onto a respective longitudinal side profile, which deformation profile projects laterally beyond the longitudinal side profile outside the housing in the region of the lower profile longitudinal face.

In another aspect, an electrically driven motor vehicle comprises a battery housing according to the preceding aspect. The motor vehicle may further comprise two rocker panels that extend at a distance from one another, wherein the battery housing is arranged between the rocker panels, and wherein the battery housing is connected to the corresponding rocker panel on the face of the deformation profile that faces the longitudinal side profile.

BRIEF DESCRIPTION OF THE DRAWINGS

The above aspects and other aspects of the invention will be apparent from and elucidated with reference to the embodiments described hereinafter. In the FIGS..

Figure 1:
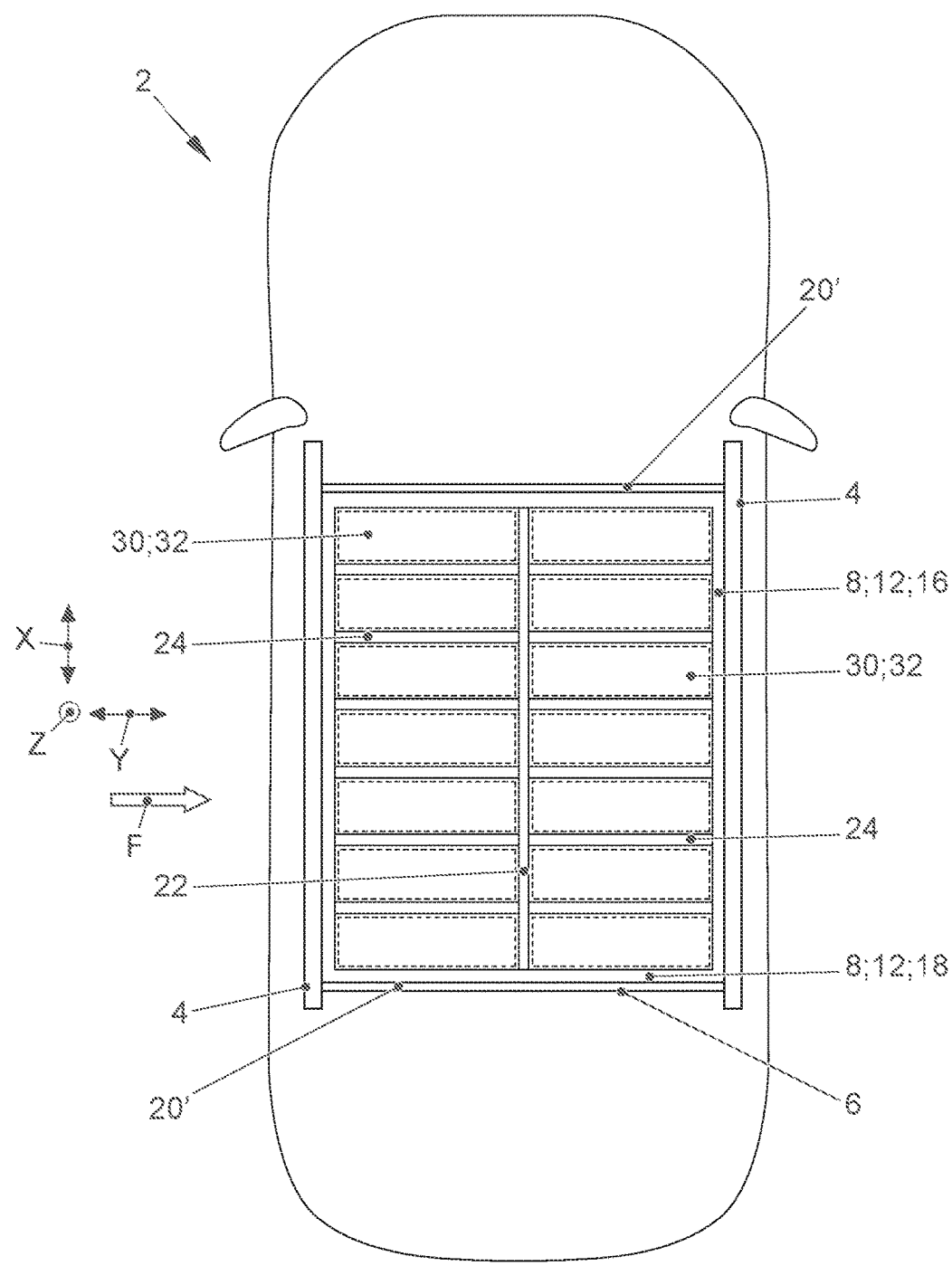
FIG. 1 shows a schematic plan view of an electrically driven motor vehicle comprising two rocker panels, between which a battery housing for a battery is arranged.
Figure 2:
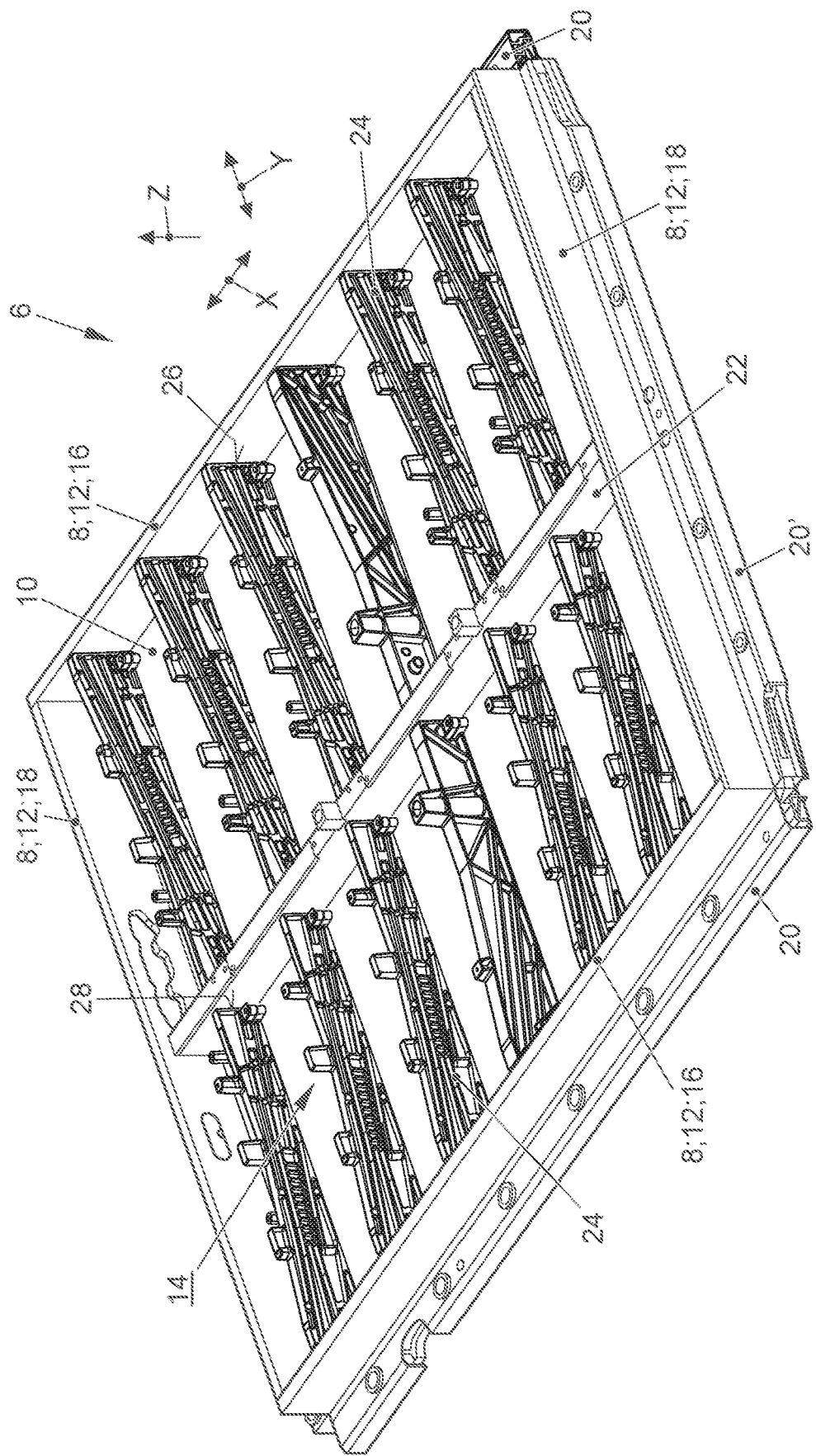
FIG. 2 shows a perspective view of the battery housing comprising a tray-shaped receptacle having a housing frame, the housing frame being formed of two longitudinal side profiles and two transverse side profiles, and a deformation profile being molded on each of the longitudinal side profiles and each of the transverse side profiles.

Parts and quantities that correspond to one another are provided with the same reference signs in all figures.

DETAILED DESCRIPTION

Technical features described in this application can be used to construct various embodiments of battery housings and electric vehicles. Some embodiments of the invention are discussed so as to enable one skilled in the art to make and use the invention.

In one aspect, a battery housing, which is provided and designed for a battery of an electrically driven motor vehicle, has a tray-shaped receptacle comprising a housing base and a housing frame. The receptacle forms a housing interior, in which battery modules or groups of cell packs of the battery, in particular, may be received.

The housing frame is formed of two rigid, in particular mutually parallel, longitudinal side profiles and two rigid transverse side profiles, which extend transversely to said longitudinal side profiles. The longitudinal side profiles have a lower profile longitudinal face that faces the housing base and an upper profile longitudinal face that faces away from the housing base.

A deformation profile is formed (e.g., molded) onto the relevant longitudinal side profile, which deformation profile is more flexible than the longitudinal side profile. The deformation profile is formed (e.g., molded) on the outside of the housing, thus on the face of the longitudinal side profile that faces away from the housing interior, in the region of the lower profile longitudinal face, in other words on the base of the housing, and projects laterally beyond the longitudinal side profile. In other words, the deformation profile projects beyond the longitudinal side profile in a direction (housing base normal) perpendicular to the surface of the housing base that faces the housing interior and perpendicularly to the profile longitudinal direction, in which the deformation profile and the longitudinal side profile extend. This direction defines the normal of the longitudinal side profile. The longitudinal side profile and the deformation profile therefore substantially form an L-shape in cross-section, i.e., with a sectional plane perpendicular to the profile longitudinal direction, the relatively long (vertical) L-limb forming the longitudinal side profile and the relatively short (horizontal) L-limb forming the deformation profile.

Beneficially, an externally introduced force in the direction of the normal of the longitudinal side profile acting on the housing frame causes said housing frame to deform. A force of this kind is caused, for example, by a side collision (crash, accident). The deformation profile deforms first before the longitudinal side profile on account of the more rigid design of the longitudinal side profile compared with the deformation profile. This way, at least some of the kinetic energy of a (collision) body acting on the deformation profile may be used for the deformation work. A deformation of the longitudinal side profile into the housing interior, i.e., toward the battery modules or respectively groups of cell packs of the battery, and associated damage on account of the application of force in particular by a collision is therefore prevented or the risk of such damage is at least drastically reduced.

In order to increase the flexural rigidity and prevent buckling or respectively warping and in some embodiments, at least one of the longitudinal side profiles may have a number of transverse struts that extend in parallel with the housing base. Therefore, the longitudinal side profile may have, e.g., a corresponding number of chambers arranged one above the other in the direction of the normal of the housing base.

In some embodiments, at least one of the deformation profiles may have at least one diagonal strut that is inclined relative to the normal of the longitudinal side profile. The deformation profile may have a flexural rigidity that is influenced by a corresponding extension of the diagonal strut. Therefore, on account of the diagonal strut, the deformation element is sufficiently rigid so as to use as much energy as possible (amount of energy) for the deformation thereof, the deformation profile in any case being more flexible than the longitudinal side profile.

At the same time, the diagonal strut may, e.g., fulfill an additional purpose. In further embodiments, said diagonal strut may be supported on a profile wall (outer profile wall) of the deformation profile such that a force acting on the deformation profile, in particular in the direction of the normal of the longitudinal side profile, is introduced into the housing base or into a bottom guard (such as, e.g., a skid plate, an underrun guard). The bottom guard is arranged on the face of the housing base facing away from the housing interior. In some embodiments, the deformation profile may have a diagonal strut for transmitting force to the housing base and a diagonal strut for transmitting force to the bottom guard. The diagonal strut may in particular be supported in a region of the profile wall that bears against the housing base or respectively, the bottom guard, when deformation has already (partially) taken place on account of a corresponding application of force, such that a corresponding transmission of force (force dissipation) is made possible, i.e., the diagonal strut is operatively connected to the housing base or respectively bottom guard.

In summary, the diagonal strut of the deformation profile may fulfill a double function. On the one hand, it may serve to transmit the force introduced into the deformation profile to the housing base or respectively bottom guard. The diagonal strut is therefore a force transducer. On the other hand, the flexural rigidity of the deformation profile may depend on the extension of the diagonal strut in the deformation profile.

In some embodiments, the deformation profile may have a first profile shoulder, which projects beyond the housing base on the lower base face facing away from the housing interior. The profile shoulder may therefore be an end stop of the deformation profile on an end face of the housing base. The end face of the housing base is the narrow face of the housing base which faces the first profile shoulder of the deformation profile, i.e., for example the narrow face of the housing base, the normal of which extends in parallel with the normal of the longitudinal side profile.

Alternatively or additionally and in some embodiments, a transmission of the force introduced into the deformation profile and acting in the direction of the normal of the longitudinal side profile may occur in a similar manner at the bottom guard by means of a second profile shoulder (catch hook), which may be provided on the lower face of the deformation profile facing away from the longitudinal side profile. The second profile shoulder projects beyond the bottom guard along the housing base normal from the housing base to the bottom guard. The second profile shoulder may therefore be an end stop of the deformation profile on an end face of the bottom guard. Similarly, the end face of the bottom guard may be the narrow face of the bottom guard which faces the second profile shoulder of the deformation profile.

In some embodiments, the deformation profile may comprise both the first profile shoulder and the second profile shoulder. On account of the deformation of the deformation profile, the first profile shoulder strikes the end face of the housing base or respectively the second profile shoulder strikes the end face of the bottom guard, and therefore the force introduced into the deformation profile is not only dissipated to the housing base or respectively bottom guard by means of the diagonal struts, but also by means of the first or respectively second profile shoulder. This way, transmission of force to the battery modules of the battery and corresponding possible damage thereto is further prevented.

In some embodiments, a number of transverse beams oriented perpendicularly to the housing base and perpendicularly to the longitudinal side profiles may be fitted in the housing interior. The first end face of at least one of the transverse beams adjoins each of the longitudinal side profiles.

In some embodiments, a longitudinal beam that extends transversely to the transverse beams, i.e., in the profile longitudinal direction of the longitudinal side profiles, may be received in the housing interior, against which longitudinal beam the transverse beams rest so as to form a lattice-like arrangement with the second end faces of said transverse beams. The battery is therefore protected in a relatively secure manner from damage caused by a force acting on the housing frame in the direction of the normal of the longitudinal side profile, in particular on account of the force-transmitting effect of the transverse beams and the lattice-like arrangement thereof in the battery housing.

Each of the transverse beams may have a number of perpendicular ascending ribs in order to increase the flexural rigidity of said transverse beams, which ribs extend from the first end face to the opposite second end face of the transverse beam and/or obliquely, i.e., at an inclination relative to the plane spanned by the housing base, toward the housing base. This in particular prevents buckling or warping of the transverse beam in the profile longitudinal direction of the longitudinal side profile. As a result, buckling or warping about a bend axis that extends substantially in the housing base normal may be prevented. This is based on the consideration that the geometrical moment of inertia, which is also referred to as the second moment of area, of the transverse beam with respect to said bend axis is increased by means of the ribs. By means of the ribs, a force acting on the first end face of the transverse beam may be dissipated into the longitudinal beam and/or, on account of the inclination of the ribs, into the housing base.

In some embodiments, the transverse struts of the longitudinal side profiles may be flush with the ribs of the transverse beam on the first end face of thereof. In other words, the ends of the ribs on the first end face of the relevant transverse beam may be at the same distance from the plane spanned by the housing base as the respectively assigned transverse struts of the longitudinal side profile. As a result, the force acting on the relevant longitudinal side profile in the direction of the normal of the longitudinal side profile is better transmitted to the transverse beams and from there to the housing base and/or longitudinal beam. A deformation of the longitudinal side profile may therefore be prevented or at least a risk of damage to the battery is reduced.

The profiles, i.e., the transverse side profiles with the deformation profiles molded thereon, and the longitudinal side profiles with the deformation profiles molded thereon, may be manufactured by means of extrusion and may, e.g., be composed of aluminum.

In some embodiments, an electrically driven motor vehicle, in the following also referred to as a motor vehicle for short, has a battery housing according to one or more of the above-described variants. In some embodiments, the housing frame of the battery housing is formed of longitudinal side profiles, a deformation profile comprising at least one diagonal strut inclined relative to the normal of the longitudinal side profile being formed (e.g., molded) on each of the longitudinal side profiles on the outside and base of the housing.

Furthermore, the motor vehicle may in some embodiments be provided with two rocker panels which extend at a distance from one another and especially run parallel with one another, the rocker panels extending in a vehicle longitudinal direction also referred to as the X direction, i.e., from the tail to the front of the motor vehicle. The rocker panels may in some embodiments be arranged in the lower portion of the motor vehicle and may be a component of the bodywork of the motor vehicle. The battery housing may be arranged between the rocker panels and may in each case be connected to the corresponding rocker panel on the face of the deformation profile that faces the longitudinal side profile. The profile longitudinal direction of the longitudinal side profiles therefore may extend in parallel with the vehicle longitudinal direction. The relevant rocker panel may therefore be arranged downstream of (above) the corresponding deformation profile in a vehicle vertical direction also referred to as the Z direction.

The transverse side profiles may in some embodiments also have a number of transverse struts that extend in parallel with the housing base in order to increase the flexural rigidity of said transverse side profiles. Additionally or alternatively, a deformation profile may be molded onto the relevant transverse side profile in a similar manner on the outside of the housing and in the region of the lower profile longitudinal face of the transverse side profile facing the housing base in order to protect the battery. However, in particular on account of an arrangement of additional vehicle components in front of or respectively behind the battery housing with respect to the vehicle longitudinal direction, a force acting on the transverse side profiles and deformation profiles molded thereon in the direction of the normal of the transverse side profile, i.e., in the vehicle longitudinal direction, in the event of an accident involving front or tail collision (accident) is typically smaller than the force acting on the longitudinal side profiles and deformation profiles molded thereon in the direction of the normal of the longitudinal side profile, i.e., in the vehicle transverse direction, in the event of an accident involving a side collision. Because of this, if the battery is otherwise sufficiently protected, and in order to save weight, the deformation profiles molded onto the transverse side profiles have no diagonal struts. Additionally or alternatively and in some embodiments, the transverse side profiles may have a small number of transverse struts compared with the longitudinal side profiles.

In some embodiments, the rocker panels may have an outer shell comprising a fin, the fin covering the deformation profile molded on the relevant longitudinal side profile on the face of said deformation profile facing away from the longitudinal side profile. The fin therefore may extend counter to the vehicle vertical direction and covers the deformation profile at least in part with respect to the vehicle transverse direction.

In the event of an accident involving a side collision, a force acts in the vehicle transverse direction, i.e., in the direction of the normal of the longitudinal side profile, and, depending on the magnitude of the collision, at least the outer shell of the rocker panel is deformed toward the battery housing. The fin of the outer shell may strike the deformation profile such that the force acting on the rocker panel is transmitted to the deformation profile not only on account of being connected thereto, but also by means of the fin striking said deformation profile, resulting in an improved dissipation of force into the deformation profile and from there into the housing base and/or bottom guard.

Reference will now be made to the drawings in which the various elements of embodiments will be given numerical designations and in which further embodiments will be discussed.

FIG. 1 shows an electromotively driven motor vehicle 2, also referred to in the following as a motor vehicle or electric vehicle, in a schematic plan view. The vehicle longitudinal direction (X direction) and vehicle transverse direction (Y direction) of said motor vehicle are indicated by X and Y, respectively, in an accompanying directional diagram. The motor vehicle 2 has rocker panels 4 which are components of the bodywork (not shown in greater detail) of the motor vehicle 2. The rocker panels 4 are arranged in parallel with and at a distance from one another as well as at the base (lower portion) of the motor vehicle 2. The rocker panels 4 additionally extend in the vehicle longitudinal direction X.

A battery housing 6 is arranged between the rocker panels 4, which battery housing is shown in more detail in FIGS. 2 to 5. The battery housing 6 has a tray-shaped receptacle 8 comprising a housing base 10 and a housing frame 12. The receptacle 8 forms a housing interior 14. In other words, the receptacle 8 delimits the housing interior 14. The housing frame 12 in turn has two longitudinal side profiles 16 that extend in parallel with the rocker panels 4, i.e., in the vehicle longitudinal direction X, and two transverse side profiles 18 that extend transversely to said longitudinal side profiles 16, i.e., in the vehicle transverse direction Y. A deformation profile 20 and 20' is molded on each of the longitudinal side profiles 16 and each of the transverse side profiles 18, respectively, which deformation profile is shown in greater detail in FIGS. 3 to 5. In FIG. 1, the deformation profile 20 molded onto the relevant longitudinal side profile 16 is covered by the corresponding rocker panel 4.

The force acting in the vehicle transverse direction Y on the corresponding rocker panel 4 of the motor vehicle 2 and by means of said rocker panel 4 on the battery housing 6 and in particular on the housing frame 12 is provided with the reference sign F and represented by means of a corresponding arrow. The force F is for example produced by means of an accident involving a collision (side crash, side collision) of an accident body with the motor vehicle 2 in the vehicle transverse direction Y.

A cuboid longitudinal beam 22 is fitted in the housing interior 14 and is oriented in parallel with the longitudinal side profiles 16 and perpendicularly to the housing base 10, the longitudinal beam 22 extending from one of the transverse side profiles 18 to the other transverse side profile 18. Furthermore, a number of transverse beams 24 are arranged in the housing interior 14. Each of the transverse beams 24 adjoins the corresponding longitudinal side profile 16 by means of the first end face 26 thereof. The opposing, second end face 28 of the relevant transverse beam 24 adjoins the longitudinal beam 22, and a lower face of the relevant transverse beam 24 adjoins the housing base 10. The transverse beams 24 are oriented transversely to the longitudinal side profile 16 and longitudinal beam 22. The transverse beams 24 therefore extend in the vehicle transverse direction Y. The transverse beams 24 and the longitudinal beam 22 form a lattice-like structure. Battery modules 30, which are represented by dashed lines, are received in the housing interior 14 between the transverse beams 24 or respectively between the transverse beams 24 and the housing frame 12, which battery modules form the (traction) battery 32.

Each of the transverse beams 24 is provided with a number of ribs 34 which project perpendicularly therefrom. The ribs 34 extend substantially in the vehicle transverse direction Y, the ribs 34 being inclined at least in portions relative to a plane spanned by the housing base 10. Some of the ribs 34 extend from the first end face 26 to the second end face 28 of the relevant transverse beam 24. The other ribs 34 extend obliquely from the first end face 26 of the relevant transverse beam 24 to the housing base 10. The ribs 34 thereby have a double function. They transmit a force acting on the first end face 26 of the transverse beam 24 to the longitudinal beam 22 and, on account of the inclination toward the housing base 10, to the housing base 10. Furthermore, the ribs 34 serve to increase the flexural rigidity of the relevant transverse beam 24. In summary, the relevant transverse beam 24 acts as a force transducer. It absorbs externally introduced forces and/or dissipates same.

Figure 3:
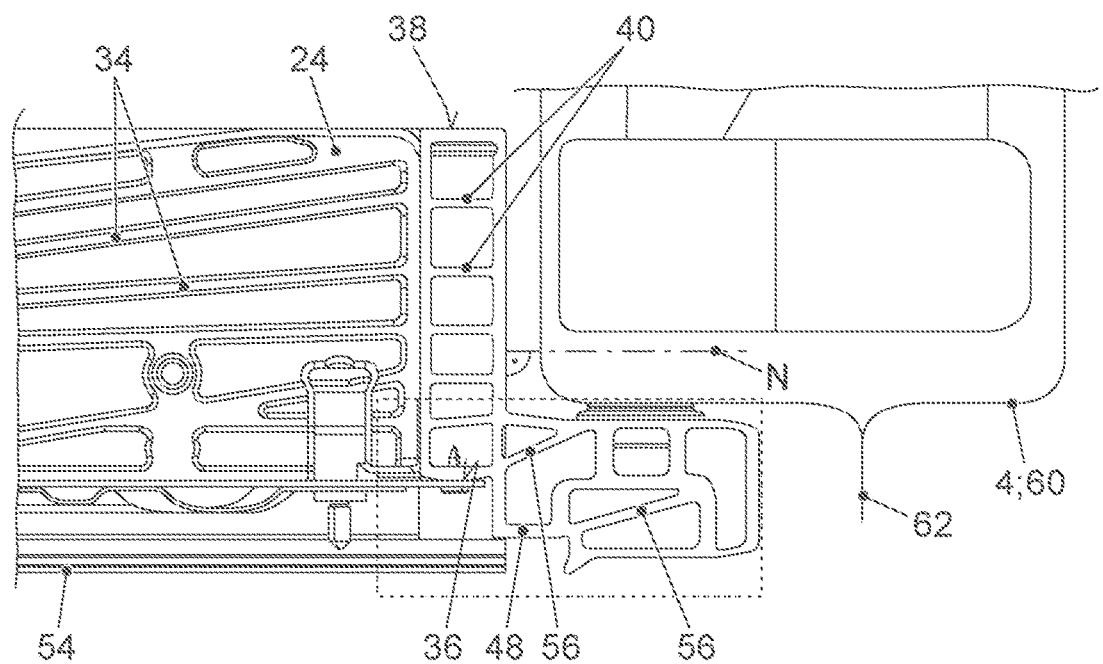
FIG. 3 shows part of a cross-section of the battery housing, the deformation profile molded onto the longitudinal side profile having diagonal struts inclined relative to the normal of the longitudinal side profile.

The sectional plane of the cross-section shown in FIG. 3 is perpendicular to a profile longitudinal direction of the longitudinal side profile 16. The profile longitudinal direction is the direction in which the profile of the longitudinal side profile 16 extends; in this case, the profile longitudinal direction is thus parallel to the vehicle longitudinal direction X. The longitudinal side profiles 16 each have a lower profile longitudinal face 36 that faces the housing base 10 and an upper profile longitudinal face 38 that faces away from the housing base 10. The deformation profile 20 is molded on the face of the longitudinal side profile 16 that faces away from the housing interior 14 in the region of the lower profile longitudinal face 36, i.e., on the base of the housing, and projects laterally beyond the longitudinal side profile 16. The deformation profile 20 thus projects beyond the longitudinal side profile 16 in the direction of a normal N of the longitudinal side profile 16, which normal extends perpendicularly to the surface of the housing base 10 that faces the housing interior 14 and that is perpendicular to the profile longitudinal direction of the longitudinal side profile 16.

The longitudinal side profile 16 has transverse struts 40 which extend in parallel with the housing base 10 in order to increase the flexural rigidity of said longitudinal side profile 16 against a force acting thereon in the direction of the normal N. Said transverse struts 40 are flush with the ribs 34 of the corresponding transverse beam 24 on the first end face 26 thereof. In other words, the ribs 34 and the assigned transverse struts 40 thereof are each at the same distance from the plane spanned by the housing base 10, as a result of which transmission of the force acting on the longitudinal side profile 16 to the relevant transverse beam 24 is improved.

The deformation profile 20 has a first profile shoulder 42, which projects beyond the housing base 10 on the lower base face 44 that faces away from the housing interior 14. The first profile shoulder therefore projects beyond the vehicle base 10 counter to a vehicle vertical direction Z. The first profile shoulder 42 is provided and designed as an end stop of the deformation profile 20 against an end face 46 of the housing base 10. The end face 46 of the housing base 10 should be understood to mean the narrow face of the housing base 10, the normal of which extends in parallel with the normal N of the longitudinal side profile 16. The end face 46 of the housing base 10 therefore faces the first profile shoulder 42 of the corresponding deformation profile 20.

Furthermore, the deformation profile 20 has a second profile shoulder 50 on the lower face 48 thereof facing away from the longitudinal side profile 16, which second profile shoulder acts as an end stop of the deformation profile 20 against an end face 52 of a bottom guard (e.g., skid plate or underrun guard) 54. The bottom guard 54 is arranged on the face of the housing base 10 that faces away from the housing interior 14 and faces the lower base face 44, said bottom guard extending in parallel with the housing base 10.

During corresponding deformation of the deformation profile 16, the first profile shoulder 42 strikes the end face 46 of the housing base 10 and the second profile shoulder 50 strikes the end face 52 of the bottom guard 54, respectively. This way, a force introduced into the deformation profile 16 is dissipated by means of the first profile shoulder 42 and by means of the second profile shoulder 50 to the housing base 10 and to the bottom guard 54, respectively.

Each of the deformation profiles 20 molded onto the longitudinal side profiles 16 has diagonal struts 56 that are inclined relative to the normal N of the longitudinal side profiles 16. Said diagonal struts are supported on a profile wall (outer profile wall) 58 of the deformation profile 20 such that a force acting on the deformation profile 20 in the direction of the normal N of the longitudinal side profile 16 is introduced into the housing base 10 or into the bottom guard 54. For this purpose, the deformation profile 20 in each case has a diagonal strut 56 for transmitting force to the housing base 10 and a diagonal strut 56 for transmitting force to the bottom guard, the diagonal strut 56 being supported in a corner region of the first profile shoulder 42 and second profile shoulder 50, respectively. During deformation of the deformation profile 20 on account of a correspondingly large force F, the diagonal struts 56 bear against the housing base 10 and bottom guard 54 in order to transmit the force to the housing base 10 and bottom guard 54, respectively.

Figure 4:
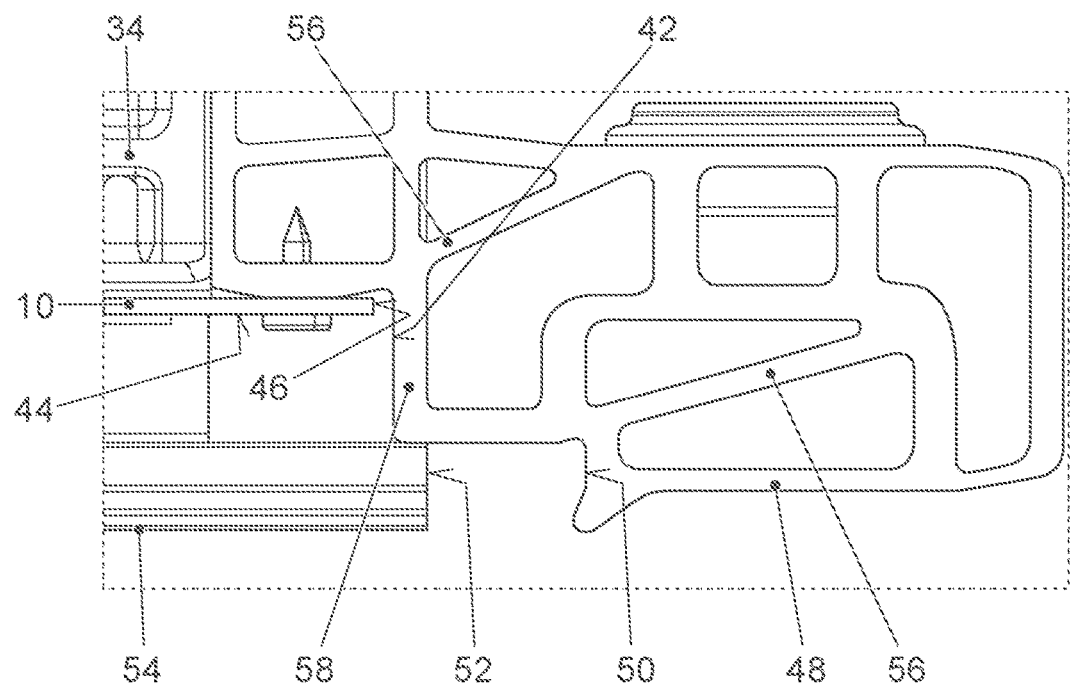
FIG. 4 shows the region IV from FIG. 3 in an enlarged view, without the rocker panel.

Furthermore, as can be seen in FIG. 3 and FIG. 4, the battery housing 6 is in each case connected to, i.e., fastened to or held on, the corresponding rocker panel 4 on the face of the deformation profile 20 facing the longitudinal side profile 16. The rocker panel 4 has an outer shell 60 comprising a fin 62. The fin 62 covers the deformation profile 20 molded on the corresponding longitudinal side profile 16 on the face of the deformation profile that faces away from the longitudinal side profile 16. The fin 62 therefore extends counter to the vehicle vertical direction Z and covers the deformation profile 16 in part with respect to the vehicle transverse direction Y.

If the force F acts on the rocker panel 4, depending on the magnitude of the side collision, at least the outer shell 60 of the rocker panel is deformed toward the battery housing 6. During correspondingly strong deformation of the outer shell 60, the fin 62 thereof strikes the deformation profile 20. As a result, the force F acting on the rocker panel 4 is transmitted to the deformation profile 20 by means of the fin 62 striking the deformation profile 20, in addition to the transmission of force on account of the connection between the rocker panel 4 and deformation panel 20.

In one variant (not shown), the deformation profile 20 has only one diagonal strut 56. Said diagonal strut is supported on the profile wall 58 such that force is transmitted solely to the bottom guard 54 or respectively to the housing base 10.

According to another variant (not shown), the transverse beams 24 have a number of beads in addition to the ribs 34. On the first end face 26 of the transverse beam 24, the respective transverse struts 40 of the longitudinal side profile 16 are flush with portions of a bead wall delimiting the bead, which portions extend in parallel with the housing base 10.

Figure 5:
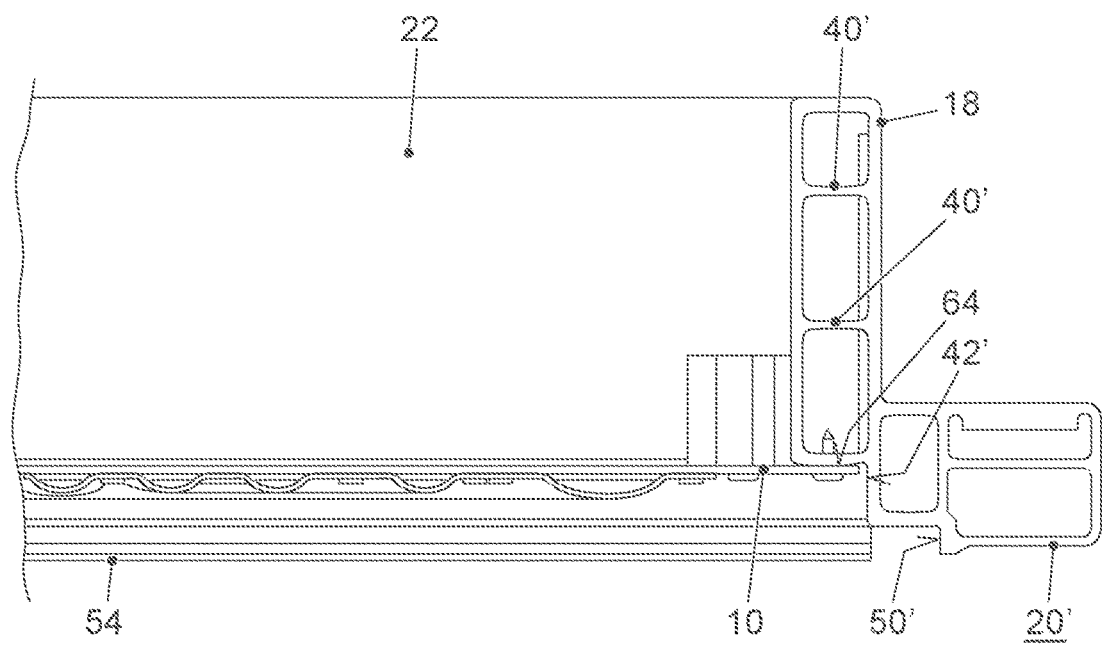
FIG. 5 shows part of a longitudinal section of the battery housing, the deformation profile molded onto the transverse side profile having, on a lower face of said deformation profile facing away from the longitudinal side profile, a profile shoulder acting as an end stop for an end face of a bottom guard.

FIG. 5 shows a longitudinal section of the housing 6 with a sectional plane that is perpendicular to a profile longitudinal direction of the transverse side profiles 18. Analogously to the longitudinal side profiles 16, the transverse side profiles 18 also have transverse struts 40' for increasing the flexural rigidity thereof. Furthermore, the deformation profile 20' is molded onto the outside of the housing and in the region of a lower profile longitudinal face 64 of the transverse side profile 18 facing the housing base 10. However, in order to save weight, the relevant transverse side profile 18 has a smaller number of transverse struts 40' compared with the longitudinal side profiles 16, and the deformation profile 20' has no diagonal struts 56. The battery 32 is sufficiently protected against an accident-induced force in the vehicle longitudinal direction X on account of vehicle components (not shown) that are arranged in front of or respectively behind the battery housing 6 with respect to the vehicle longitudinal direction X. Additionally, analogously to the deformation profile 20 molded onto the relevant longitudinal side profile 16, the deformation profile 20' molded onto the relevant transverse side profile 18 has a first profile shoulder 42' and a second profile shoulder 50' that act as end stops for the housing base 10 and bottom guard 54, respectively.

The invention is not limited to the above-described exemplary embodiment. Indeed, a person skilled in the art may also derive other variants of the invention here from without departing from the scope of the invention. In particular, all individual features described in connection with said exemplary embodiment may also be combined with one another in another way without departing from the object of the invention.

REFERENCE NUMBER LIST

2 Motor vehicle
4 Rocker panel
6 Battery housing
8 Receptacle
10 Housing base
12 Housing frame
14 Housing interior
16 Longitudinal side profile
18 Transverse side profile
20, 20' Deformation profile
22 Longitudinal beam
24 Transverse beam
26 First end face of the transverse beam
28 Second end face of the transverse beam
30 Battery module
32 Battery
34 Rib
36 Lower profile longitudinal face of the longitudinal side profile
38 Upper profile longitudinal face of the longitudinal side profile
40, 40' Transverse strut
42, 42' First profile shoulder
44 Lower base face
46 End face of the housing base
48 Lower face
50, 50' Second profile shoulder
52 End face of the bottom guard
54 Bottom guard
56 Diagonal strut
58 Profile wall
60 Outer shell
62 Fin
64 Lower profile longitudinal face of the transverse side profile
F Force
N Normal of the longitudinal side profile
X Vehicle longitudinal direction Y Vehicle transverse direction Z Vehicle vertical direction The invention has been described in the preceding using various exemplary embodiments. Other variations to the disclosed embodiments can be understood and effected by those skilled in the art in practicing the claimed invention, from a study of the drawings, the disclosure, and the appended claims. In the claims, the word "comprising" or "including" does not exclude other elements or steps, and the indefinite article "a" or "an" does not exclude a plurality. A single processor, module or other unit or device may fulfil the functions of several items recited in the claims.

The mere fact that certain measures are recited in mutually different dependent claims or embodiments does not indicate that a combination of these measured cannot be used to advantage. Any reference signs in the claims should not be construed as limiting the scope.

What is claimed is:

1. A battery housing for a battery of an electrically driven motor vehicle, having a tray-shaped receptacle having a housing base and a housing frame; wherein the receptacle forms a housing interior;
    wherein the housing frame is formed of two rigid longitudinal side profiles and two rigid transverse side profiles, which extend transversely to said longitudinal side profiles;
    wherein the longitudinal side profiles have a lower profile longitudinal face that faces the housing base and an upper profile longitudinal face that faces away from the housing base;
    wherein a deformation profile is formed onto a respective longitudinal side profile, which deformation profile projects laterally beyond the longitudinal side profile outside the housing in the region of the lower profile longitudinal face; wherein
    a number of transverse beams that are oriented perpendicular to the housing base and perpendicular to the longitudinal side profiles are arranged in the housing interior, wherein at least one of the transverse beams adjoining each of the longitudinal side profiles, and wherein a respective transverse beam has a number of ribs, which extend from a first end face of the transverse beam adjoining the longitudinal side profile to the opposite second end face of the transverse beam and/or obliquely toward the housing base; wherein
    at least one of the longitudinal side profiles has a number of transverse struts that extend in parallel with the housing base; wherein
    the transverse struts of the longitudinal side profiles are flush with the ribs of the transverse beam on the first end face thereof.

2. The battery housing according to claim 1, wherein at least one of the deformation profiles has at least one diagonal strut that is inclined relative to the normal of the longitudinal side profile.

3. The battery housing according to claim 2, wherein the diagonal strut is supported on a profile wall of the deformation profile such that a force acting on the deformation profile is introduced into the housing base or into a bottom guard arranged on the face of the housing base that faces away from the housing interior.

4. The battery housing according to claim 3, wherein a second profile shoulder that is configured as an end stop of the deformation profile on an end face of the bottom guard is provided on the lower face of the deformation profile facing away from the longitudinal side profile.

5. The battery housing according to claim 3, wherein the deformation profile has a first profile shoulder that projects beyond the housing base on the lower base face facing away from the housing interior, which first profile shoulder is configured as an end stop of the deformation profile on an end face of the housing base.

6. The battery housing according to claim 2, wherein the deformation profile has a first profile shoulder that projects beyond the housing base on the lower base face facing away from the housing interior, which first profile shoulder is configured as an end stop of the deformation profile on an end face of the housing base.

7. The battery housing according to claim 1, wherein the deformation profile has a first profile shoulder that projects beyond the housing base on the lower base face facing away from the housing interior, which first profile shoulder is configured as an end stop of the deformation profile on an end face of the housing base.

8. The battery housing according to claim 7, wherein a second profile shoulder that is configured as an end stop of the deformation profile on an end face of the bottom guard is provided on the lower face of the deformation profile facing away from the longitudinal side profile.

9. An electrically driven motor vehicle comprising a battery housing according to claim 1 and comprising two rocker panels that extend at a distance from one another;
    wherein the battery housing is arranged between the rocker panels; and
    wherein the battery housing is connected to the corresponding rocker panel on the face of the deformation profile that faces the longitudinal side profile.

10. The motor vehicle according to claim 9, wherein the rocker panels have an outer shell comprising a fin, the fin covering the face of the deformation profile that faces away from the longitudinal side profile.

* * * * *